(12) United States Patent
Mihalcea et al.

(10) Patent No.: US 7,869,309 B2
(45) Date of Patent: Jan. 11, 2011

(54) DUAL WIRE INTEGRATED WAMR/HAMR WRITING HEAD

(75) Inventors: Christophe Daniel Mihalcea, Pittsburgh, PA (US); William Albert Challener, Sewickley, PA (US); Werner Scholz, Pittsburgh, PA (US); Kalman Pelhos, Pittsburgh, PA (US); Dorothea Buechel, Pittsburgh, PA (US); Julius Hohlfeld, Wexford, PA (US); Nils Jan Gokemeijer, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 1309 days.

(21) Appl. No.: 11/201,662

(22) Filed: Aug. 11, 2005

(65) Prior Publication Data

US 2007/0036040 A1    Feb. 15, 2007

(51) Int. Cl.
*G11B 11/00* (2006.01)

(52) U.S. Cl. .................. 369/13.14; 369/13.17; 360/59

(58) Field of Classification Search ... 369/13.01–13.02, 369/13.33, 121, 122, 44.11, 44.27, 112.27, 369/300
See application file for complete search history.

(56) References Cited

U.S. PATENT DOCUMENTS

| | | | | |
|---|---|---|---|---|
| 5,065,390 A * | 11/1991 | Miyauchi et al. | ........ | 369/112.22 |
| 5,494,473 A * | 2/1996 | Dupuis et al. | ................... | 451/1 |
| 5,889,641 A * | 3/1999 | Belser et al. | ................. | 360/313 |
| 5,986,978 A * | 11/1999 | Rottmayer et al. | ........ | 369/13.17 |
| 6,307,827 B1 * | 10/2001 | Nishiwaki | .............. | 369/112.07 |
| 6,376,827 B1 * | 4/2002 | Kasama et al. | .............. | 250/216 |
| 6,404,706 B1 * | 6/2002 | Stovall et al. | ............. | 369/13.17 |
| 6,507,540 B1 * | 1/2003 | Berg et al. | ............... | 369/13.13 |
| 6,671,128 B2 * | 12/2003 | Crawford | ................. | 360/234.5 |
| 6,714,370 B2 * | 3/2004 | McDaniel et al. | ............. | 360/59 |
| 6,728,080 B2 * | 4/2004 | Ito et al. | ..................... | 360/321 |
| 6,795,630 B2 | 9/2004 | Challener et al. | | |
| 6,898,352 B2 * | 5/2005 | Deliwala | ...................... | 385/40 |
| 6,975,580 B2 * | 12/2005 | Rettner et al. | ............... | 369/300 |
| 7,032,427 B2 * | 4/2006 | Niwa et al. | ................... | 72/325 |
| 7,155,732 B2 * | 12/2006 | Rausch et al. | ............... | 720/659 |
| 7,289,422 B2 * | 10/2007 | Rettner et al. | ............... | 369/300 |
| 7,518,815 B2 * | 4/2009 | Rottmayer et al. | ........... | 360/59 |
| 7,678,476 B2 * | 3/2010 | Weller et al. | ............. | 428/828.1 |
| 2001/0017820 A1 * | 8/2001 | Akiyama et al. | .............. | 369/13 |
| 2001/0034185 A1 | 10/2001 | Katoh et al. | | |
| 2003/0048992 A1 * | 3/2003 | Lundqvist | ..................... | 385/50 |
| 2003/0112542 A1 * | 6/2003 | Rettner et al. | ................. | 360/59 |
| 2003/0128452 A1 | 7/2003 | McDaniel et al. | | |
| 2003/0128633 A1 | 7/2003 | Batra et al. | | |
| 2003/0128634 A1 | 7/2003 | Challener | | |

(Continued)

FOREIGN PATENT DOCUMENTS

WO    WO 03/021576 A1    3/2003

*Primary Examiner*—Dismery E Mercedes
(74) *Attorney, Agent, or Firm*—Robert P. Lenart, Esq.; Pietragallo Gordon Alfano Bosick & Raspanti, LLP

(57) ABSTRACT

An apparatus comprises a waveguide, an optical transducer for coupling electromagnetic radiation from the waveguide to a point adjacent to an air bearing surface to heat a portion of a storage medium, and a first wire positioned adjacent to the air bearing surface, wherein current in the wire produces a magnetic field in the heated portion of the storage medium.

20 Claims, 8 Drawing Sheets

U.S. PATENT DOCUMENTS

| | | |
|---|---|---|
| 2003/0137772 A1 | 7/2003 | Challener |
| 2003/0184903 A1 | 10/2003 | Challener |
| 2003/0235121 A1* | 12/2003 | Eppler ..................... 369/13.24 |
| 2004/0001394 A1* | 1/2004 | Challener et al. ........ 369/13.32 |
| 2004/0001420 A1 | 1/2004 | Challener |
| 2004/0008591 A1 | 1/2004 | Johns et al. |
| 2004/0062503 A1 | 4/2004 | Challener |
| 2004/0075942 A1* | 4/2004 | Bajorek ..................... 360/122 |
| 2004/0081030 A1* | 4/2004 | Jang et al. ................ 369/13.17 |
| 2004/0169950 A1 | 9/2004 | Clinton et al. |
| 2004/0194119 A1 | 9/2004 | Miyanishi et al. |
| 2004/0228022 A1* | 11/2004 | Ueyanagi ..................... 360/59 |
| 2005/0041950 A1 | 2/2005 | Rottmayer et al. |
| 2005/0078565 A1 | 4/2005 | Peng et al. |
| 2005/0122850 A1* | 6/2005 | Challener et al. ........ 369/13.24 |
| 2006/0143635 A1* | 6/2006 | Liu et al. ..................... 720/659 |
| 2009/0028007 A1* | 1/2009 | Oumi et al. ............... 369/13.14 |

* cited by examiner

DUAL WIRE INTEGRATED WAMR/HAMR WRITING HEAD

STATEMENT REGARDING FEDERALLY SPONSORED RESEARCH OR DEVELOPMENT

This invention was made with United States Government support under Agreement No. 70NANB1H3056 awarded by the National Institute of Standards and Technology (NIST). The United States Government has certain rights in the invention.

FIELD OF THE INVENTION

This invention relates to data storage devices and more particularly to such devices that utilize a combination of wire amplified magnetic recording (WAMR) and heat assisted magnetic recording (HAMR).

BACKGROUND OF THE INVENTION

In thermally assisted optical/magnetic data storage, information bits are recorded on a layer of a storage medium at elevated temperatures, and the heated area in the storage medium determines the data bit dimension. Heat assisted magnetic recording (HAMR) generally refers to the concept of locally heating a recording medium to reduce the coercivity so that an applied magnetic writing field can more easily direct the magnetization of the recording medium during the temporary magnetic softening caused by the heat source. The coercivity of the medium at ambient temperature can be much higher than the coercivity during recording, thereby enabling stability of the recorded bits at higher storage densities and with smaller bit cells. Heat assisted magnetic recording can be applied to any type of magnetic storage media, including longitudinal media, perpendicular media and patterned media.

Heat assisted magnetic recording has been proposed for extending the areal storage density of magnetic disk drives to 1 Tb/in$^2$ or higher. One of the enablers for this technology is an optical transducer (OT) which is capable of efficiently delivering light energy to the recording medium in a spot confined approximately to the dimensions of the magnetic mark to be recorded, i.e., at dimensions well below the diffraction limit around the visible region of the electromagnetic spectrum. The light energy heats up the magnetic recording medium, which lowers its coercivity. Magnetic switching of the bit in the media can then be achieved by applying a magnetic field in the desired direction. To produce this magnetic field it is necessary to integrate metallic and/or magnetic structures into the recording head and to place them in close proximity to the optical transducer. The combination of a conventional "pole" based magnetic recording head structure and an optical transducer results in a complex structure. In addition, every metallic structure close to the optical transducer negatively influences its optical performance. It is therefore desirable to keep the number and size of the metallic structures near the optical transducer to a minimum.

Furthermore, if a thin film optical waveguide is used to deliver the optical power to the transducer, metallic structures inside this waveguide would also hinder the light from freely propagating, and further diminish the optical energy density at the optical transducer.

Magnetic write heads have been proposed wherein the magnetic write field is produced by, and/or amplified by, a wire positioned adjacent to a write pole at an air bearing surface (ABS) of the head. The wire can generate large local magnetic fields by way of large current densities in the wire. This recording head is referred to as a wire amplified magnetic recording (WAMR) head. The flux density from the wire can be high enough to affect the magnetization of an adjacent storage disc, or to magnetize a write pole and generate additional flux density with an appropriate field direction and spatial profile to augment the write field.

It would be desirable to combine the WAMR magnetic field delivery concept with the optical requirements of a HAMR head.

SUMMARY OF THE INVENTION

This invention provides an apparatus comprising a waveguide, an optical transducer for coupling electromagnetic radiation from the waveguide to a point adjacent to an air bearing surface to heat a portion of a storage medium, and a first wire positioned adjacent to the air bearing surface, wherein current in the wire produces a magnetic field in the heated portion of the storage medium.

The invention also encompasses an apparatus comprising a data storage medium, a recording head for writing data to the data storage medium, and an arm for positioning the recording head adjacent to the data storage medium, wherein the recording head includes a waveguide, an optical transducer for coupling electromagnetic radiation from the waveguide to a point adjacent to an air bearing surface to heat a portion of a storage medium, and a first wire positioned adjacent to the air bearing surface, wherein current in the wire produces a magnetic field in the heated portion of the storage medium.

In another aspect, the invention provides a method of fabricating a recording head, the method comprising: forming a first wire structure adjacent to an optical waveguide in an intermediate structure; and lapping the intermediate structure to form an air bearing surface, using the first wire as an electronic lapping guide.

DETAILED DESCRIPTION OF THE INVENTION

Figure 1:
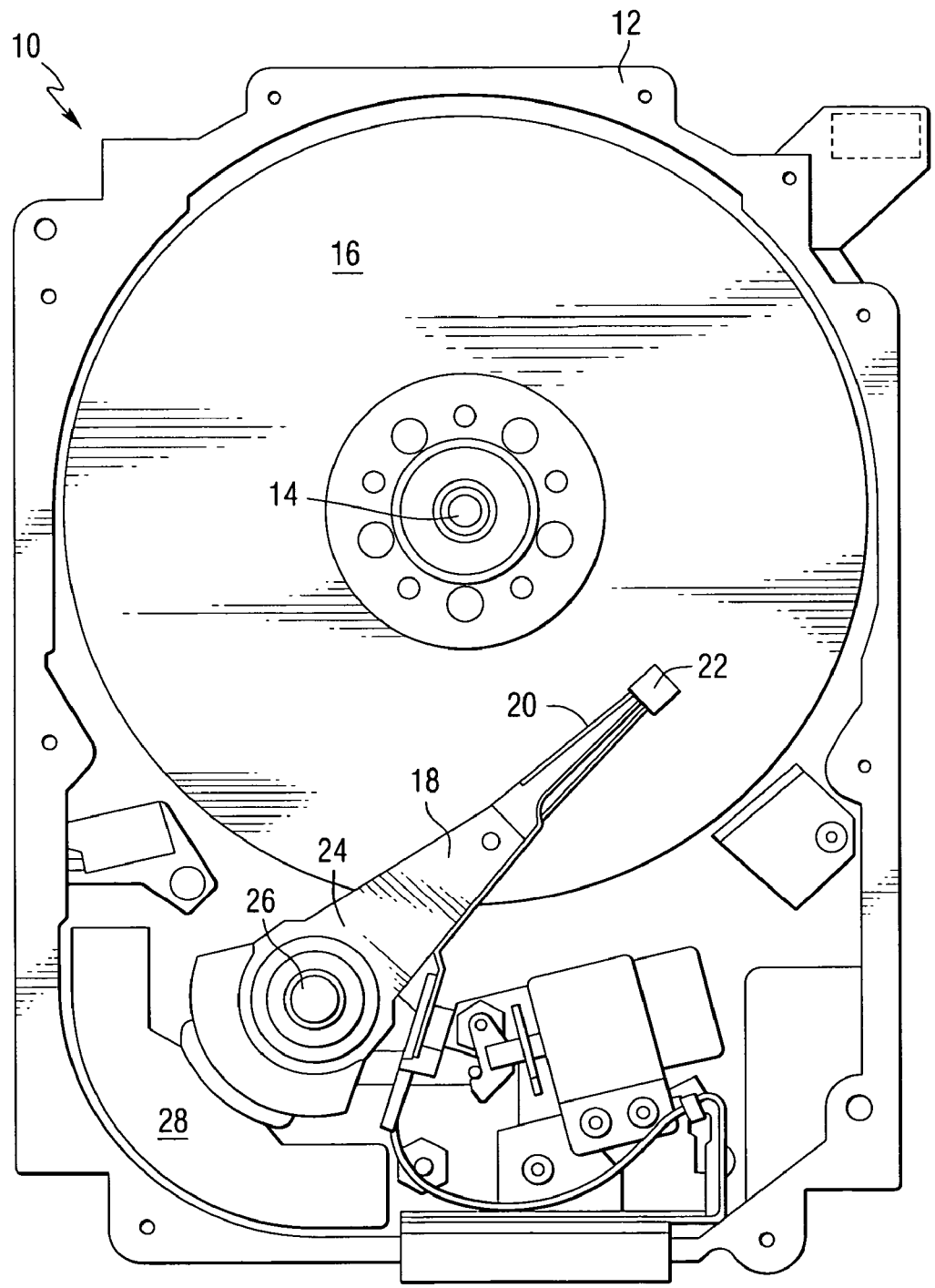
FIG. 1 is a pictorial representation of the mechanical portion of a disc drive that can be constructed in accordance with the invention.

Referring to the drawings, FIG. 1 is a pictorial representation of the mechanical portion of a disc drive 10 that can be constructed in accordance with the invention. The disc drive includes a housing 12 (with the upper portion removed and the lower portion visible in this view) sized and configured to contain the various components of the disc drive. The disc drive includes a spindle motor 14 for rotating at least one data storage medium 16 within the housing, in this case a magnetic disc. At least one arm 18 is contained within the housing 12, with each arm 18 having a first end 20 with a recording and/or reading head or slider 22, and a second end 24 pivotally mounted on a shaft by a bearing 26. An actuator motor, which may be a voice coil motor 28, is located at the arm's second end 24, for pivoting the arm 18 to position the head 22 over a desired sector of the disc 16. The actuator motor 28 is controlled by a controller that is not shown in this view.

In a HAMR disc drive, the recording head, or write head, includes a structure for directing electromagnetic radiation, for example ultraviolet, infrared or visible light, onto a surface of the recording medium to heat a portion of the medium, thereby reducing the magnetic coercivity of that portion. For this description, the electromagnetic radiation is referred to as light. A recording pole, or write pole, then subjects the heated portion of the medium to a magnetic field to affect the direction of magnetization of the heated portion. The structure for directing electromagnetic radiation can be, for example, a solid immersion lens, a solid immersion mirror, or waveguide for focusing the light to a small spot, and an associated optical transducer that is used to further decrease the size of the light spot. Light can be produced using a light source such as a laser, and transmitted to the slider using an optical fiber or by free space transmission. The light can be coupled into the structure using known techniques, such as a grating coupler.

Figure 2:
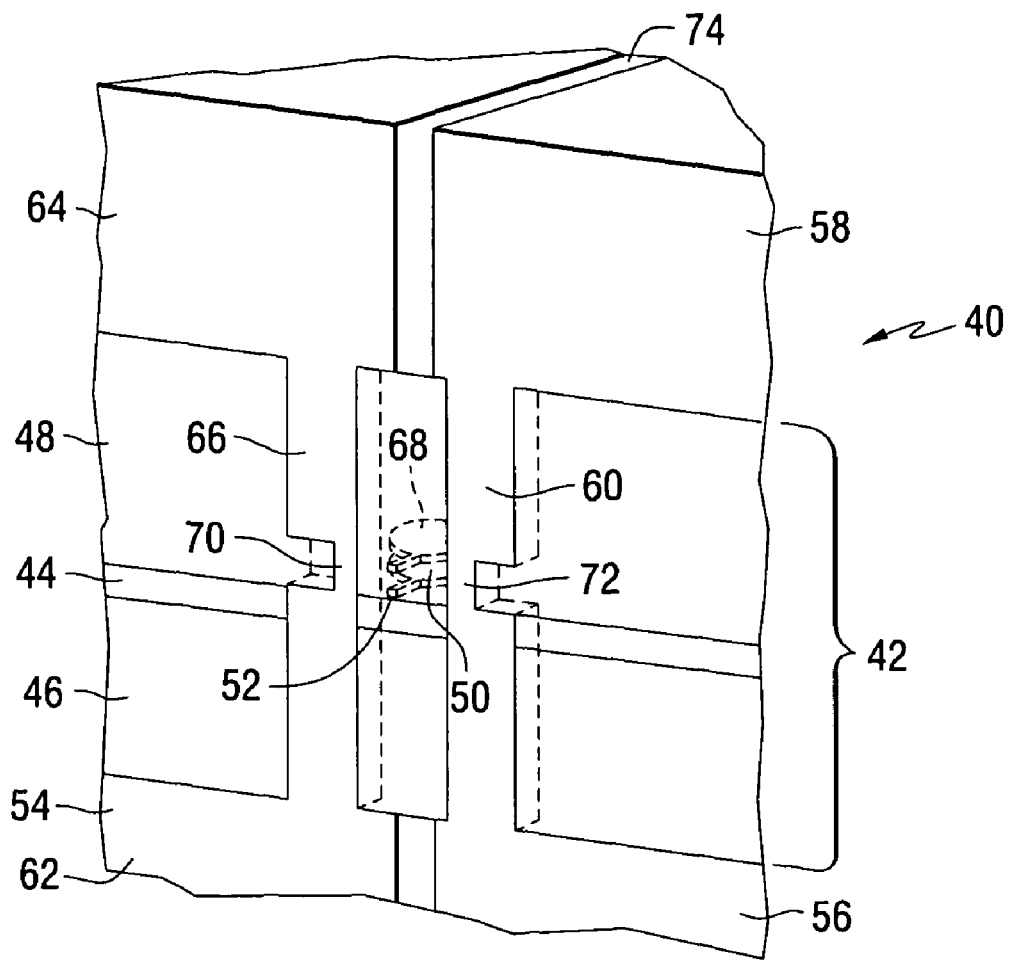
FIG. 2 is an air bearing surface (ABS) view of a solid immersion mirror (SIM) based HAMR recording head.

FIG. 2 is an isometric view of a recording head 40 showing the air bearing surface (ABS) of the recording head. The recording head includes a solid immersion mirror (SIM) 42 formed by a planar waveguide having a core layer 44 between two cladding layers 46, 48. An optical transducer 50 is positioned in the waveguide. A tip 52 of the optical transducer is positioned adjacent to the air bearing surface 54 of the recording head. First and second electrically conductive leads/heat sinks 56 and 58 are positioned on opposite sides of the SIM. A first wire 60 extends between the first and second conductive leads adjacent to the air bearing surface. Third and fourth electrically conductive leads/heat sinks 62 and 64 are also positioned on opposite sides of the SIM. A second wire 66 extends between the third and fourth conductive leads adjacent to the air bearing surface. The wires are positioned on opposite sides of the optical transducer. A magnetic pole piece 68 is positioned between the wires. Each of the wires includes a truncated portion 70 and 72 in the vicinity of the magnetic pole piece. In this example, the conductive leads are separated by an insulating layer 74. However, in other embodiments, the leads 58 and 64 or the leads 54 and 56 can be electrically and physically connected to each other by means of a conductor through, atop or below the insulating layer 74.

The two metallic wires run along the downtrack direction and can be fed with currents that are supplied by the thick metallic leads located on opposite sides of the waveguide. If the currents through the metallic wires flow in opposite directions, the magnetic field between the wires has a strong component perpendicular to the ABS, which makes it most suitable for perpendicular recording systems. If the currents through the wires flow in the same direction, the magnetic field has a strong in-plane component parallel to the ABS, which makes it most suitable for longitudinal recording systems. The leads also work as heat sinks. In this example, the optical transducer is located outside the core layer of the waveguide and adjacent to the magnetic pole structure. The magnetic pole is placed close to the optical transducer in order to maximize the overlap between the magnetic field of the magnetic pole and the heat spot of the optical transducer. However, a too small distance between the optical transducer and a metallic magnetic pole reduces the efficiency of the optical transducer. Both, the optical transducer and the magnetic pole are adjacent to the ABS to maximize their efficiency. Their exact relative position with respect to each other as well as with respect to the core layer of the waveguide depends on their individual shapes and the materials used. For some shapes and materials it might be useful to place both outside the core layer whereas other cases might require to place one or both of them inside the core layer.

This invention uses one or more metallic wires at the air bearing surface (ABS) of a write head. A magnetic field is produced by a current in the wire(s). The wires are positioned to locate this field at a desired position with respect to the optical transducer. The magnetic pole is positioned in the waveguide to enhance the magnetic field at the optical transducer position. The magnetic pole structure can be located in contact with the optical transducer or at any desired spacing with respect to the optical transducer and/or the core layer in the device.

In principle, the pole can have an arbitrary shape. For simplicity, it is depicted to have the same shape as the optical transducer in FIG. 2. Furthermore, the magnetic pole can be positioned anywhere inside the waveguide stack. A second pole (not shown in this figure) can be positioned symmetrically on the other side of the optical transducer to increase the magnetic flux density. The truncation in the wire causes current crowding to produce a relatively strong magnetic field in the truncated area.

While the non-truncated portion of the wires can have dimensions on the order of microns in a cross-track direction, the truncated portion would be on the order of several tens of nanometers in order to produce high enough magnetic fields for the HAMR application.

Figure 3:
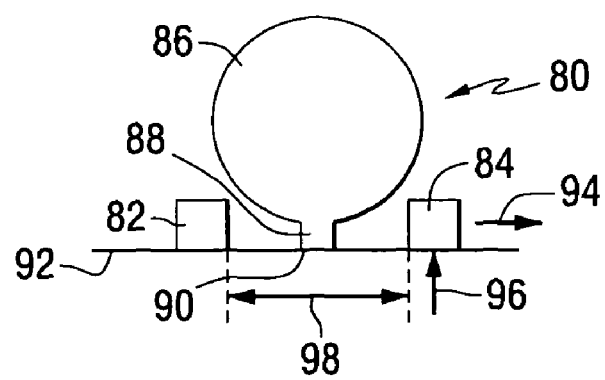
FIG. 3 is a schematic representation of an optical transducer and two adjacent wires.

FIG. 3 is a schematic representation of an optical transducer 80 and two adjacent wires 82 and 84, positioned on opposite sides of the optical transducer. In this example, the optical transducer includes a circularly shaped disk 86 and a rectangular or cylindrical extension 88 having an end 90 that would be positioned adjacent to the air bearing surface 92 of the write head. In this example, the width of the wires is the dimension in a direction 94 parallel to the air bearing surface and the thickness is the dimension in a direction 96 perpendicular to the air bearing surface. The wire spacing is the distance between the wires as illustrated by arrow 98.

Figure 4:
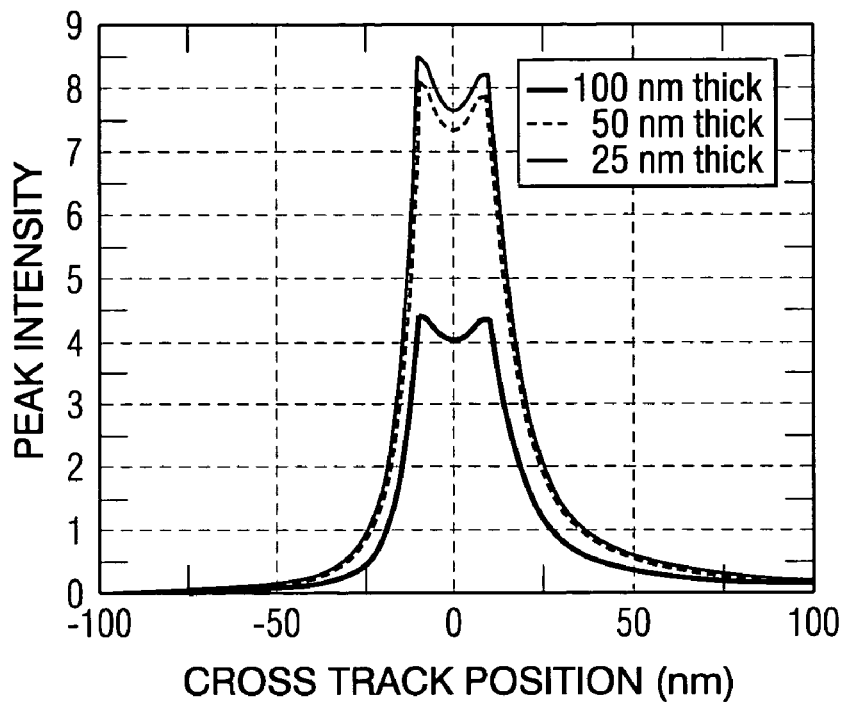
FIG. 4 is a graph that illustrates the optical transducer efficiency as a function of wire thickness.
Figure 5:
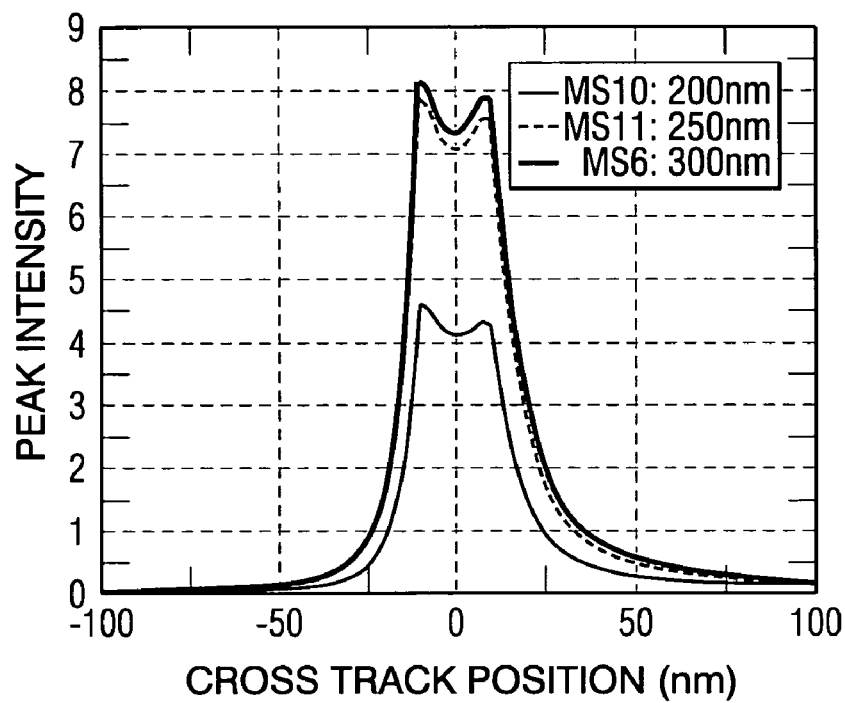
FIG. 5 is a graph that illustrates the optical transducer efficiency as a function of wire spacing.

The performance of this structure has been simulated. The influence of the wires on the optical transducer efficiency is illustrated in FIG. 4 as a function of wire thickness for a wire spacing of 300 nm. As can be seen from FIG. 4, wires with thicknesses of 50 nm and below do not significantly disturb the optical transducer efficiency. FIG. 5 shows the influence of the wire spacing on the optical transducer efficiency. A wire spacing of 250 nm or wider does not significantly influence the optical transducer efficiency.

Figure 6:
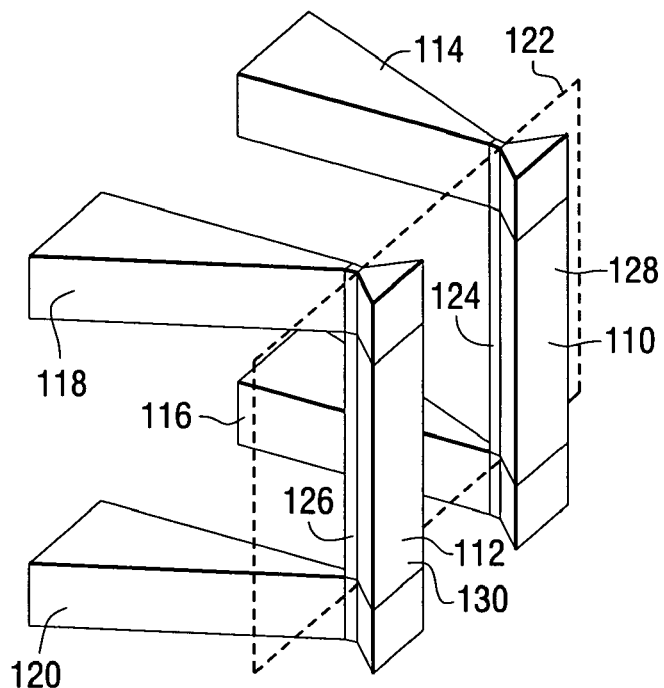
FIG. 6 is an isometric view of two wires and associated conductors.
Figure 7:
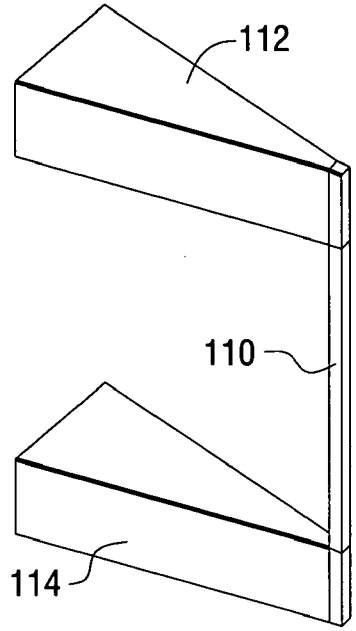
FIG. 7 is an isometric view of a wire and associated conductors.

FIG. 6 is an isometric view of two wires 110 and 112, and associated conductors 114, 116, 118 and 120, that can be included in a recording head. Plane 122 represents the position of the air bearing surface of the recording head. The structure of FIG. 6 is an intermediate structure, wherein the wires include first portions 124 and 126 on a first side of the air bearing surface plane, and second portions 128 and 130 on a second side of the air bearing surface plane. Portions 128 and 130 would be removed using a lapping operation. FIG. 7 is an isometric view of wire 110 and associated conductors 114 and 116, after the lapping operation.

FIG. 6 shows the wires before lapping, when they can also be used as electronic lapping guides (ELGs). In the structure of FIG. 6, the two wires can be separated by a distance of, for example, 2 μm, and the length of each wire (the distance between the conductors) can be, for example, 2 μm. For these dimensions, the wires shown in FIG. 6 have a resistance of $R=U/I=0.775\Omega$ (assuming Cu bulk resistivity $\rho=1.786\times 10^{-8}\ \Omega m$) and the field component perpendicular to the ABS in the center between the two wires is $H_y=0.028$ T for a current of 100 mA, where the current flows in opposite direction through the two wires.

During lapping, the front portion of the wires is ground away and, in one example, the resistance increases to $R=4.1\Omega$, when the wires have reached their final cross section, which is 100×100 nm².

If the distance between the wires is reduced to 200 nm, the perpendicular field increases to $H_y=0.22$ T for a current of 100 mA. At a distance of 10 nm from the ABS, the field reaches 0.2 T.

Figure 8:
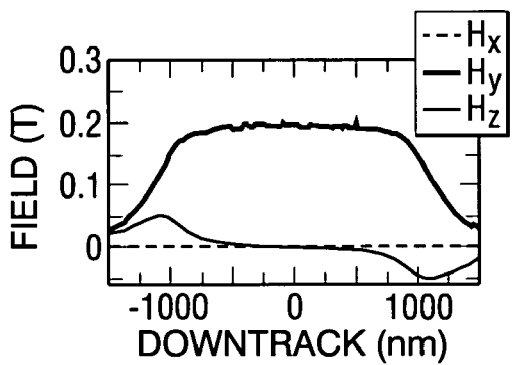
FIGS. 8, 9 and 10 are graphs of field profiles for the structure of FIG. 7.
Figure 9:
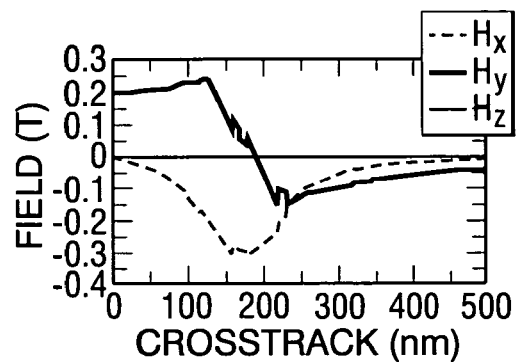
Figure 10:
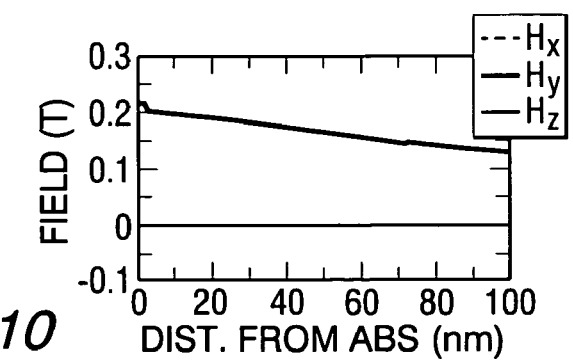

FIGS. 8, 9 and 10 show the downtrack and cross-track magnetic field profiles as well as the field as a function of distance from the ABS. FIGS. 8, 9 and 10 show calculated field profiles at 10 nm from the ABS, for two wires in the geometry of FIG. 6, but with only 200 nm distance between wires.

In order to amplify the field of the wires, a magnetic pole can be integrated into the head structure. Micromagnetic simulations of the magnetic properties of an FeCo pole, which includes a cylindrical disk portion with a diameter of 200 nm and a throat portion with variable length (throat height, $t_h=\{20, 70, 120\}$ nm), have been carried out. The thickness of the pole was varied between L=50 and 100 nm. The following material parameters for FeCo were used: $M_s=2.4$ T, $K_1=-4800$ J/m³, and $A=13\times 10^{-12}$ J/m.

Figure 11:
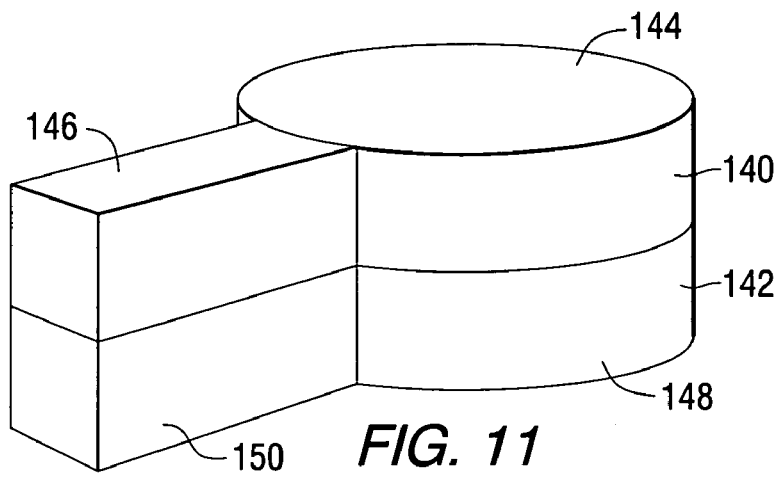
FIG. 11 is an isometric view of an optical transducer and a magnetic pole.

FIG. 11 illustrates the geometry of a magnetic pole 140, which has a shape similar to the optical transducer, or pin, 142 of some HAMR head designs. The pole includes a disk shaped portion 144 and a throat portion 146. The optical transducer includes a disk shaped portion 148 and a throat portion 150.

Figure 12:
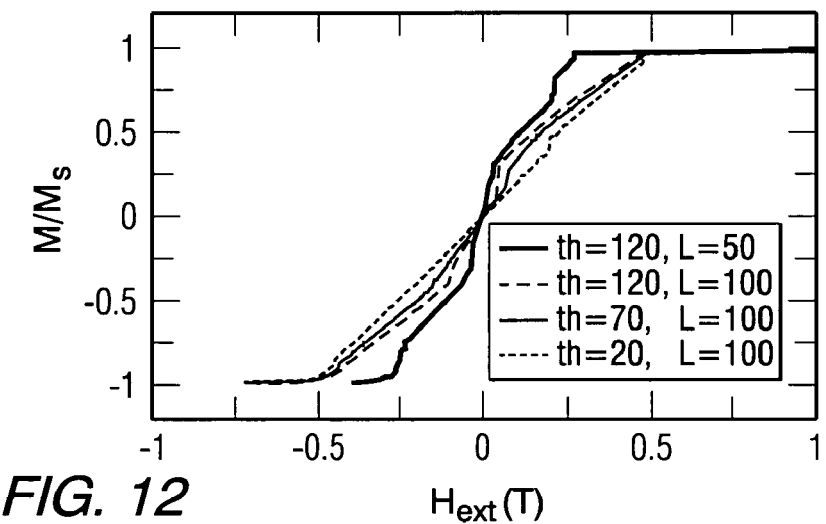
FIG. 12 shows demagnetization curves for pin-shaped magnetic poles.

In one example, the pole can have a throat height of $t_h=120$ nm and a thickness of L=100 nm. FIG. 12 shows demagnetization curves for the pin-shaped poles of FIG. 11, with different throat lengths $t_h$ and different thicknesses L. Demagnetization curves for four different pole geometries were calculated with a finite element micromagnetics code using the energy minimization method. The pole with the longest throat height ($t_h=120$ nm) has the lowest (but still positive) nucleation field of 0.27 T, because its shape anisotropy helps to keep the pole saturated. As a result, it also requires the lowest field to reach saturation (~0.3 T). The shortest throat leads to an almost linear hysteresis curve with a nucleation and saturation field of 0.48 T.

Figure 13:
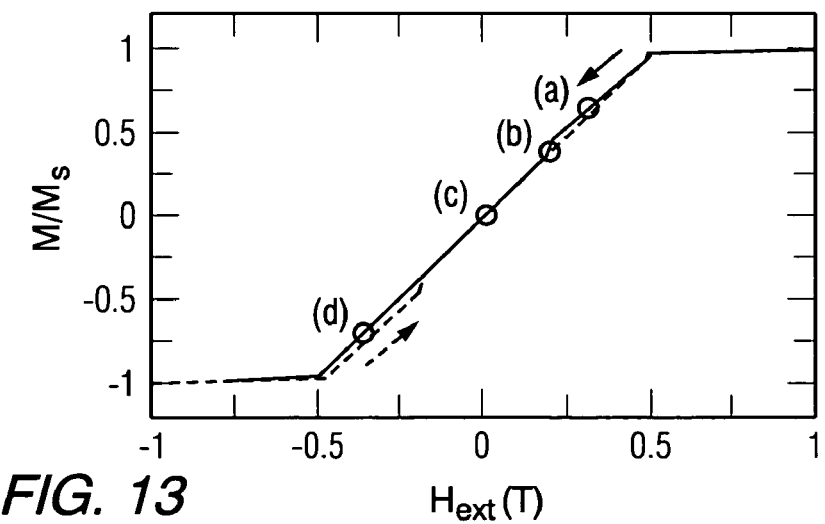
FIG. 13 shows a hysteresis curve for pin-shaped magnetic poles.

FIG. 13 is a hysteresis curve and magnetization distribution snapshots for a pin-shaped pole with a throat length of $t_h=20$ nm and a thickness of L=100 nm. The magnetization is perpendicular to the ABS. The hysteresis curve is almost linear for a thick pole with a short throat. The flux closure state (vortex state), which is found in remanence in soft magnetic "nanodots", is typical of soft magnetic cylindrical nanostructures. Thus, in the remanent state these poles generate very little field.

Figure 14:
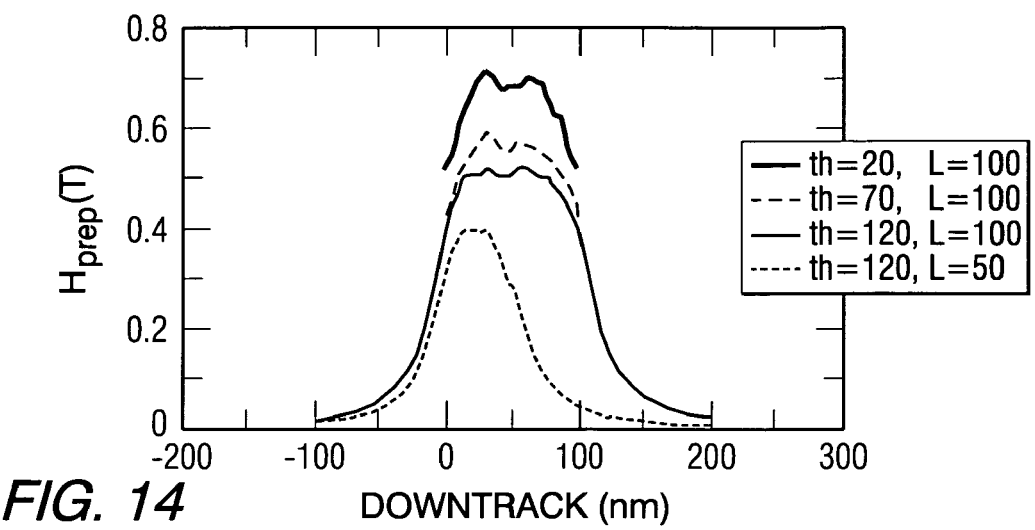
FIGS. 14 and 15 are graphs of a field profile versus downtrack direction.

Downtrack field profiles of the perpendicular field component of the saturated state (in a homogeneous external field) for different pole shapes are shown in FIG. 14. FIG. 14 shows the calculated downtrack field profiles at 20 nm from the ABS for pin-shaped poles with different throat lengths $t_h$ and thicknesses L. The thick pole with the shortest throat length generates the largest field of about 0.7 T at a distance of 20 nm from the ABS. However, the field decays very quickly for increasing downtrack distance from the pole. Thus, a magnetic pole with the design shown above needs to be located very close to the pin in order to get maximum overlap between the optical spot and the "magnetic spot".

A metallic magnetic pole needs to be separated by a certain distance from the optical pin to avoid interference with the optical properties of the optical transducer. Alternatively, ferrites or garnets, which have a considerably higher optical transmission coefficient than metals, may be used for the pole.

Figure 15:
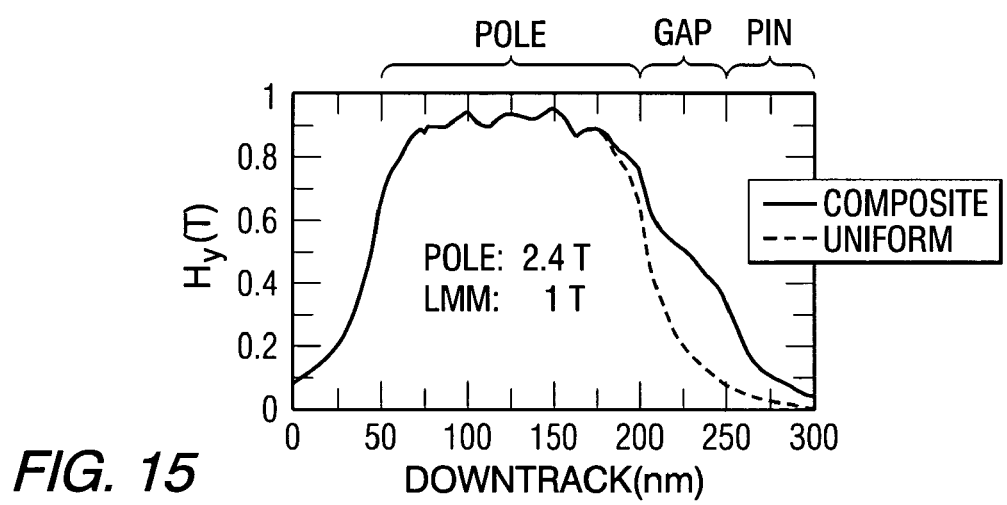

An alternative structure includes an optical pin, a metallic magnetic pole with high saturation magnetization at a certain distance from the pin (>50 nm), and an optically less intrusive, low moment magnetic material pole (e.g., a ferrite or garnet) sandwiched between the optical pin and the metallic pole. FIG. 15 shows the calculated field profile for a uniform head structure with and without a low-moment magnetic material sandwiched between the main pole and the pin. FIG. 15 shows downtrack field profiles for a "uniform" 150 nm thick pole with a non-magnetic gap between the pole and the pin, and a "composite" head having a low moment (1 T) magnetic material in the gap.

Figure 16:
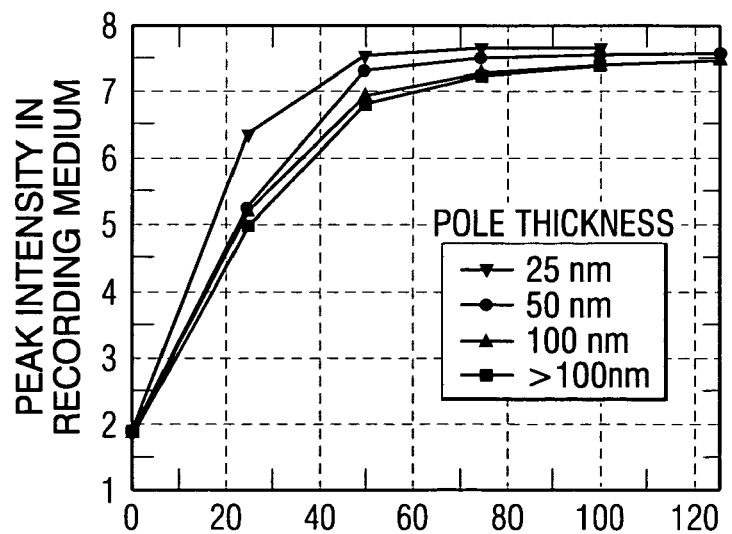
FIG. 16 is a graph of field intensity versus spacing between an optical transducer and a magnetic pole.

FIG. 16 shows the effect of a recording pole on the optical performance of the optical transducer as a function of spacing between the optical transducer and the pole. When the spacing is zero, the recording pole is directly laminated to the optical transducer. For this simulation, the optical properties of the recording pole were chosen to be those of bulk iron, although there is very little difference between iron, cobalt, and nickel at a wavelength of 830 nm. The coupling efficiency measured by the peak field intensity inside the recording layer drops quickly for spacings below 40 nm. Several recording pole thicknesses are graphed. As the pole thickness increases the coupling efficiency drops, but the effect is not sizable. Therefore, for 50 nm spacings and greater, the recording pole can be made as thick as desired. A second pole can be placed on the opposite side of the optical transducer. This arrangement might be useful in a ring head geometry for tilting the net field at the recording location within the medium. However, the second pole should not be located inside the core layer, where it would substantially decrease the optical efficiency. Thus, the distance from the optical transducer to the second pole would be larger than that between the optical transducer and the first pole and only very little perpendicular magnetic field could be delivered by the second magnetic pole.

Figure 17:
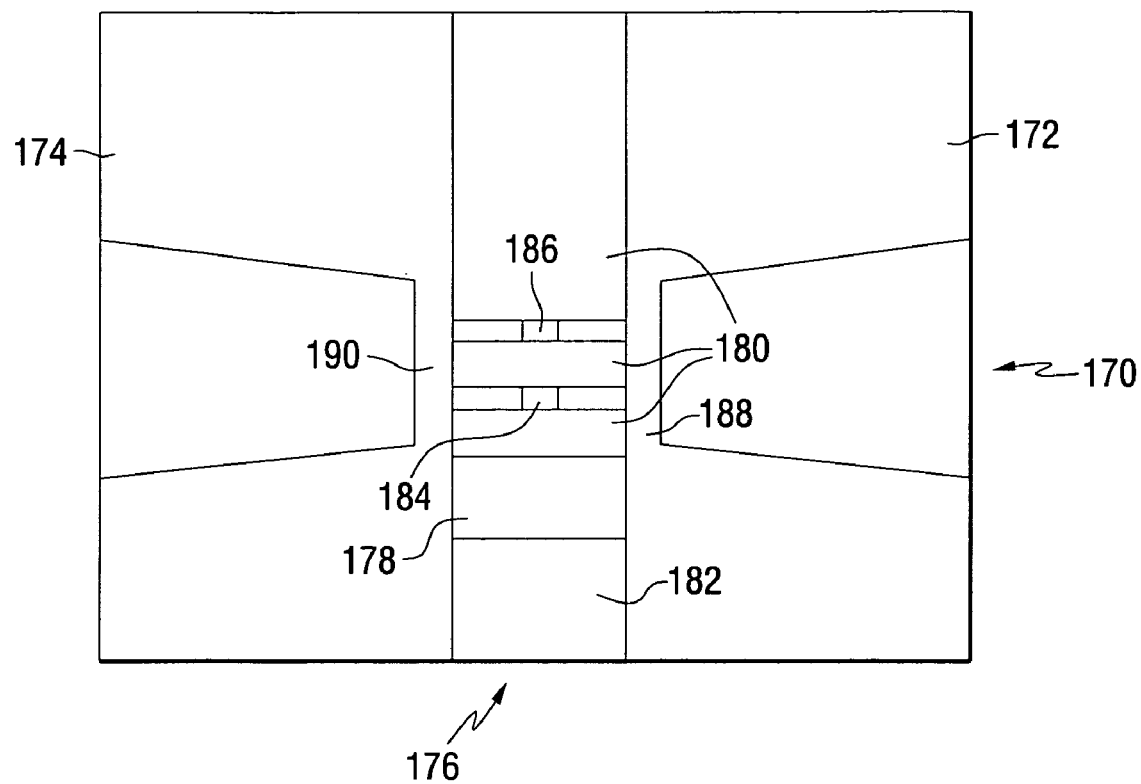
FIG. 17 is an air bearing surface view of a write head constructed in accordance with the invention.

FIG. 17 is a plan view of a portion of an air bearing surface of another write head 170 constructed in accordance with the invention. Wires 172 and 174 are positioned on opposite sides of a waveguide 176 having a core layer 178 and cladding layers 180 and 182 on opposite sides of the core layer. An optical transducer 184 is positioned in the waveguide adjacent to the core layer. A magnetic pole 186 is also positioned in the waveguide. The waveguide includes the inner cladding, core and outer cladding layers. The optical transducer and the pole do not interrupt the stack because these two are small and are embedded into the waveguide close to the ABS.

Truncated portions 188 and 190 of the wires concentrate the magnetic field produced by current in the wires, in the vicinity of the magnetic pole. In this example, the wires are truncated such that the maximum magnetic field will be located at the magnetic pole. Other geometries are conceivable, for instance, the magnetic pole could be located inside the core layer, etc. The wire truncation, the shape of the ampere wire, and its position relative to the pole and optical transducer can also be conveniently adjusted. The advantage of this "ABS-structuring" is that one could generate easily a whole variety of devices by shifting the nano-wires with respect to the pole and optical transducer along one slider bar. Also, the wires would be formed before the ABS pattern, and the wires will get coated with a protective layer.

Figure 18:
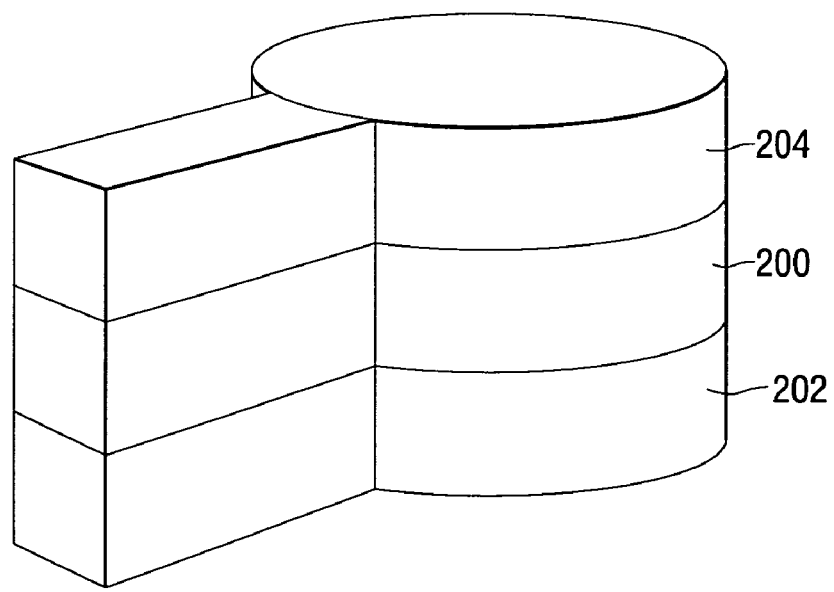
FIG. 18 is an isometric view of an alternative pin/pole configuration.

FIG. 18 is an isometric view of an alternative pin/pole configuration. In this configuration a low moment pole 200 is positioned between an optical transducer 202 and a high moment pole 204.

The high moment magnetic pole can be made of, for example, FeCo, FeCoNi, or FeCoCu. The low moment magnetic pole can be made of, for example, ferrite or garnet. In order to reduce the influence of the magnetic pole on the optical transducer performance, the pole material should be optically transparent. The wires and conductive heat sinks can be made of, for example, Cu, Ag, Al, Au, or AuTa multilayers. The optical transducer can be made of, for example, Au, Al, Ag, or Cu. The waveguide can be made of, for example, $Al_2O_3$, $TiO_2$, $Ta_2O_5$, $SiO_2$, or $ZrO_2$.

All materials listed above are suitable for this head design. The optimum choice depends on various parameters of the final design, e.g. the best material for the optical transducer depends on the wavelength of the light.

These recording heads can be manufactured using a self-aligning process to produce wires with the desired thickness. A further reduction in fabrication complexity of the entire device can be achieved by abolishing electric lapping guides (ELGs) and using the wires for the same purpose. The truncation in the wires can be formed by several methods. From a processing point of view, it would be easy to make a pole, which includes the same shape as the pin.

The recording heads of this invention can be fabricated by defining the wires in a lithography step that is also used to define the solid immersion mirror. Fabricating the SIM devices requires etching about 2 microns deep into the waveguide stack substrate simultaneously. The pattern printed is a groove structure that protects the SIM surface with some suitable masking material while the surroundings are deep etched into the waveguide material. It is beneficial to obtain vertical sidewalls during this process. The sidewalls are then metallized, the gap refilled with suitable material, and the wafers are processed to the end. The ABS is generated by cutting the wafers into bars and lapping these bars just to the desired SIM opening. If the sidewall of the device is metallized and the shape of the photomask adjusted, it is possible to lap the device such that a part of the metal is kept at the ABS surface.

Figure 19:
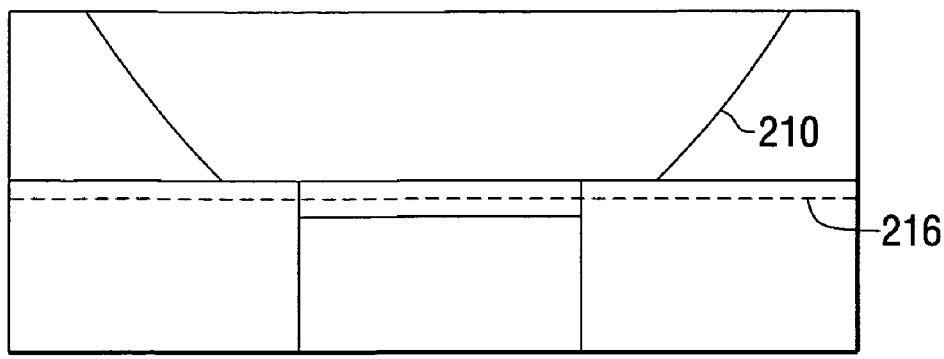
FIGS. 19 and 20 show in top view a portion of one possible mask design used to etch the SIM structure into the waveguide stack. Only the vicinity of the final ABS area is shown.
Figure 20:
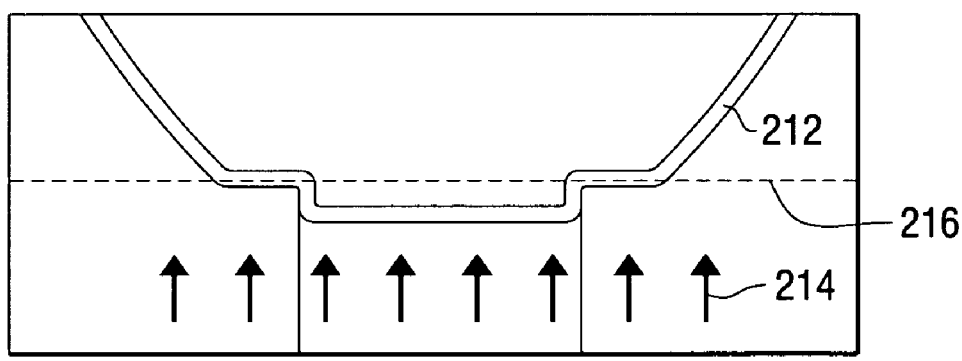
Figure 21:
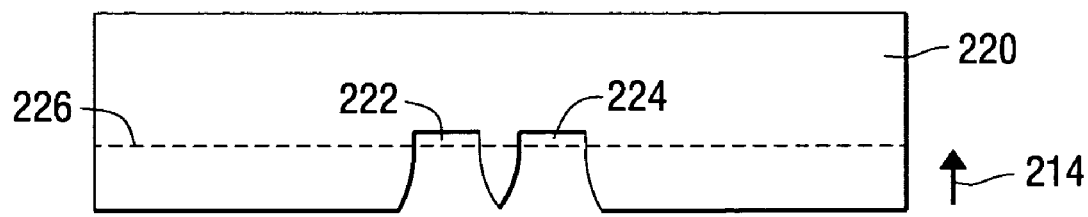
FIG. 21 is a schematic representation similar to FIGS. 19 and 20. The alternative mask design shown in FIG. 21 allows the fabrication of two wires in downtrack direction.

FIGS. 19, 20 and 21 show intermediate structures used in the fabrication method of the invention to obtain metallic structures at the ABS. A side wall 210 is etched and subsequently metallized 212. A lapping process illustrated by arrows 214 removes material up to a line 216 to stop inside the sidewall metallization.

FIG. 21 is a schematic representation of the ABS area of a mask pattern 220 that can be used to fabricate two wires 222 and 224 in the downtrack direction. Only the necessary features to fabricate the wires are shown, along with the final ABS line 226. After the etch, the sidewalls need to be metallized before the devices are finally lapped to the target line, leaving two wires with a predefined thickness behind. The wires can be used as electronic lapping guides to control the lapping process.

The wire dimensions in cross-track direction can be arbitrarily chosen, i.e., they can be on the order of one micron, such that conventional photolithography techniques can be used to print the patterns. During fabrication of the leads, the wires can be used as electrical lapping guides. This would produce very precise wire thicknesses and a very accurate ABS positioning. Furthermore, the overall complexity of the entire head build would be reduced.

The waveguide stack would be placed on thick metal leads to heat sink the wires and to connect the wires to bonding pads on the slider. After etching the SIMs and planarizing the structure, the thick leads would be placed on top of the device for electrical connection. These leads can be recessed with respect to the ABS in order to avoid having portions of the leads at the ABS surface. In the illustrated examples, the leads are separated. However they can also be shorted together to further reduce the complexity of the structure.

To obtain the desired wires with dimensions on a nanometer scale, the wafers need to be sliced and lapped to their final positions. At the stage where the sliders usually undergo the ABS patterning, ebeam lithography followed by an etching process can be used to produce the necessary truncation. It is also possible to use a focused ion beam (FIB) tool to manipulate the wires by cutting out pieces of the wire in the desired locations. Another approach is to produce the entire wires, not with the technique described above, but with lithography, etching and lift-off techniques.

The wires can be patterned at the ABS generation point using ebeam lithography plus etching. Alternatively, e-beam lithography plus lift-off can be used. The entire wire can be made by connecting to the leads on top and bottom. FIB structuring can also be used.

While the invention has been described in terms of several examples, it will be apparent to those skilled in the art that various changes can be made to the described examples without departing from the scope of the invention as set forth in the following claims.

What is claimed is:

1. An apparatus comprising:
   a waveguide;
   a transducer for coupling electromagnetic radiation from the waveguide to a point adjacent to an air bearing surface to heat a portion of a storage medium; and
   a first wire positioned adjacent to the air bearing surface, wherein current in the first wire produces a magnetic field in the heated portion of the storage medium.

2. The apparatus of claim 1, wherein the first wire includes a truncated portion adjacent to the transducer.

3. The apparatus of claim 1, further comprising:
   a magnetic pole for concentrating the magnetic field.

4. The apparatus of claim 3, wherein the magnetic pole is separated from the transducer.

5. The apparatus of claim 3, further comprising:
a low moment pole positioned between the magnetic pole and the optical transducer.

6. The apparatus of claim 5, wherein the low moment pole comprises a ferrite or garnet.

7. The apparatus of claim 3, further comprising:
a second magnetic pole positioned on a side of the transducer opposite to the first magnetic pole.

8. The apparatus of claim 1, further comprising:
a second wire positioned adjacent to the air bearing surface on a side of the waveguide opposite to the first wire.

9. The apparatus of claim 8, further comprising:
first and second electrically conductive leads positioned on opposite sides of the waveguide and electrically connected to the first wire; and
third and fourth electrically conductive leads positioned on opposite sides of the waveguide and electrically connected to the second wire.

10. An apparatus comprising:
a data storage medium;
a recording head for writing data to the data storage medium; and
an arm for positioning the recording head adjacent to the data storage medium;
wherein the recording head includes a waveguide, a transducer for coupling electromagnetic radiation from the waveguide to a point adjacent to an air bearing surface to heat a portion of the data storage medium, and a first wire positioned adjacent to the air bearing surface, wherein current in the first wire produces a magnetic field in the heated portion of the data storage medium.

11. The apparatus of claim 10, wherein the first wire includes a truncated portion adjacent to the transducer.

12. The apparatus of claim 10, further comprising:
a magnetic pole for concentrating the magnetic field.

13. The apparatus of claim 12, wherein the magnetic pole is separated from the transducer.

14. The apparatus of claim 12, further comprising:
a low moment pole positioned between the magnetic pole and the transducer.

15. The apparatus of claim 14, wherein the low moment pole comprises a ferrite or garnet.

16. The apparatus of claim 11, further comprising:
a second magnetic pole positioned on a side of the transducer opposite to the first magnetic pole.

17. The apparatus of claim 10, further comprising:
a second wire positioned adjacent to the air bearing surface on a side of the waveguide opposite to the first wire.

18. The apparatus of claim 17, further comprising:
first and second electrically conductive leads positioned on opposite sides of the waveguide and electrically connected to the first wire; and
third and fourth electrically conductive leads positioned on opposite sides of the waveguide and electrically connected to the second wire.

19. A method of fabricating a recording head, the method comprising:
forming a first wire structure adjacent to an optical waveguide and a transducer in an intermediate structure; and
lapping the intermediate structure to form an air bearing surface wherein an end of the transducer is positioned at the air bearing surface, using the first wire as an electronic lapping guide.

20. The method of claim 19, wherein the first wire and the optical waveguide are formed in a single lithography step.

* * * * *